July 15, 1952   S. J. FIACCO   2,603,007
SNOW SHOVEL ATTACHMENT FOR MOTOR VEHICLES
Filed May 3, 1948   6 Sheets-Sheet 1
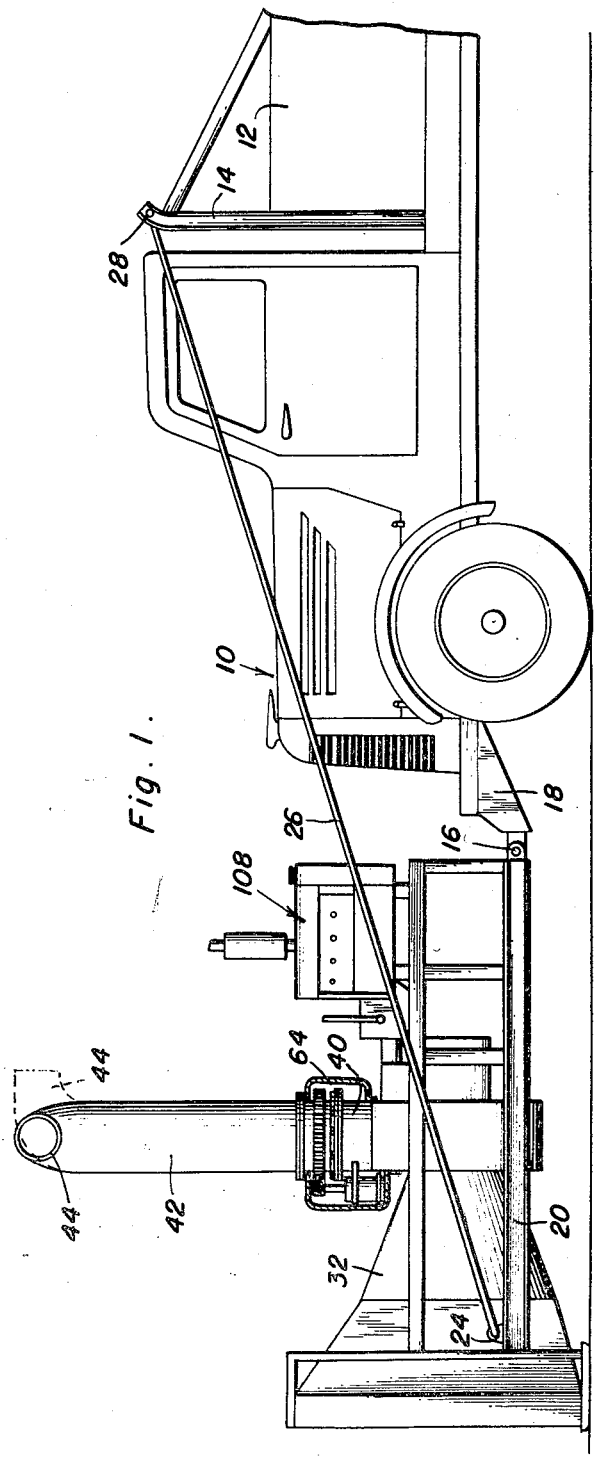
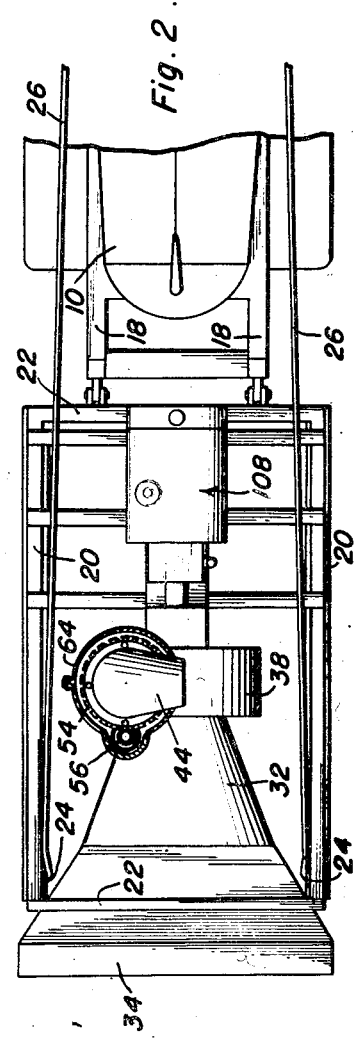
Sebastian J. Fiacco
INVENTOR.

July 15, 1952　　　　　S. J. FIACCO　　　　　2,603,007
SNOW SHOVEL ATTACHMENT FOR MOTOR VEHICLES
Filed May 3, 1948　　　　　　　　　　　　　　6 Sheets-Sheet 2
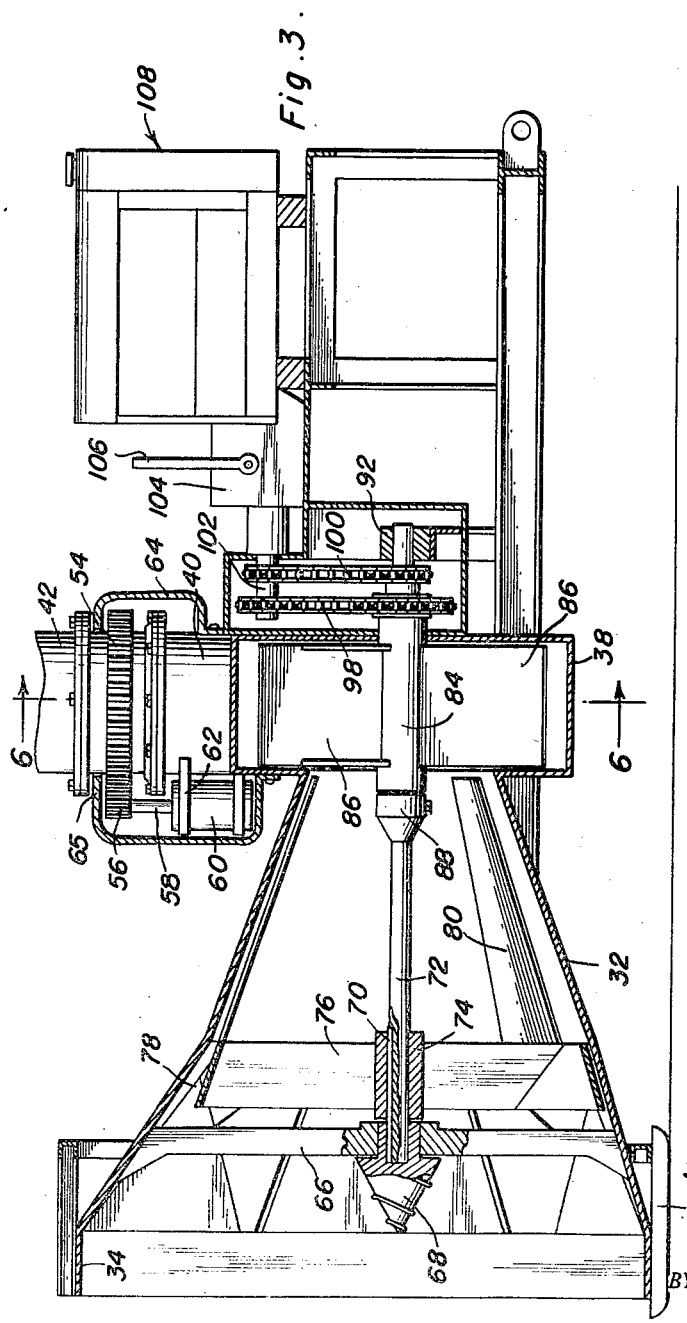
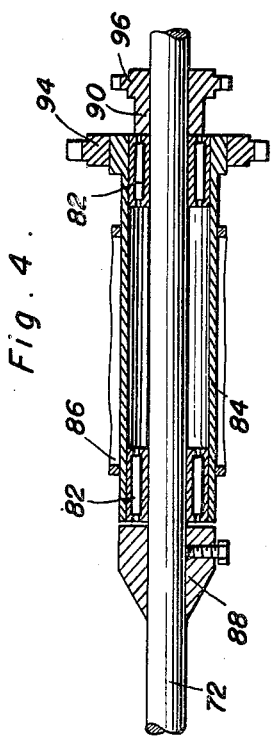
Sebastian J. Fiacco
INVENTOR.

July 15, 1952 S. J. FIACCO 2,603,007
SNOW SHOVEL ATTACHMENT FOR MOTOR VEHICLES
Filed May 3, 1948 6 Sheets-Sheet 3
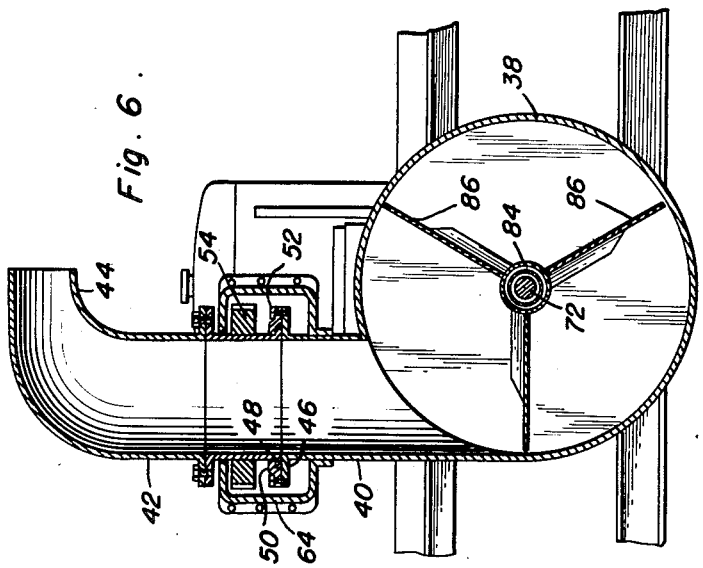
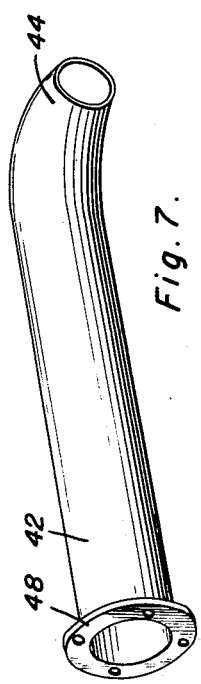
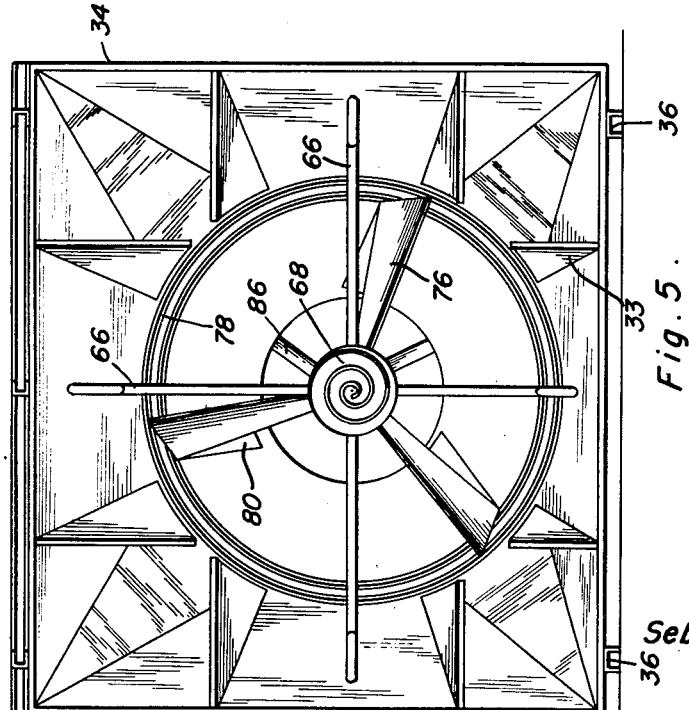
Sebastian J. Fiacco
INVENTOR.

July 15, 1952   S. J. FIACCO   2,603,007
SNOW SHOVEL ATTACHMENT FOR MOTOR VEHICLES
Filed May 3, 1948   6 Sheets-Sheet 4
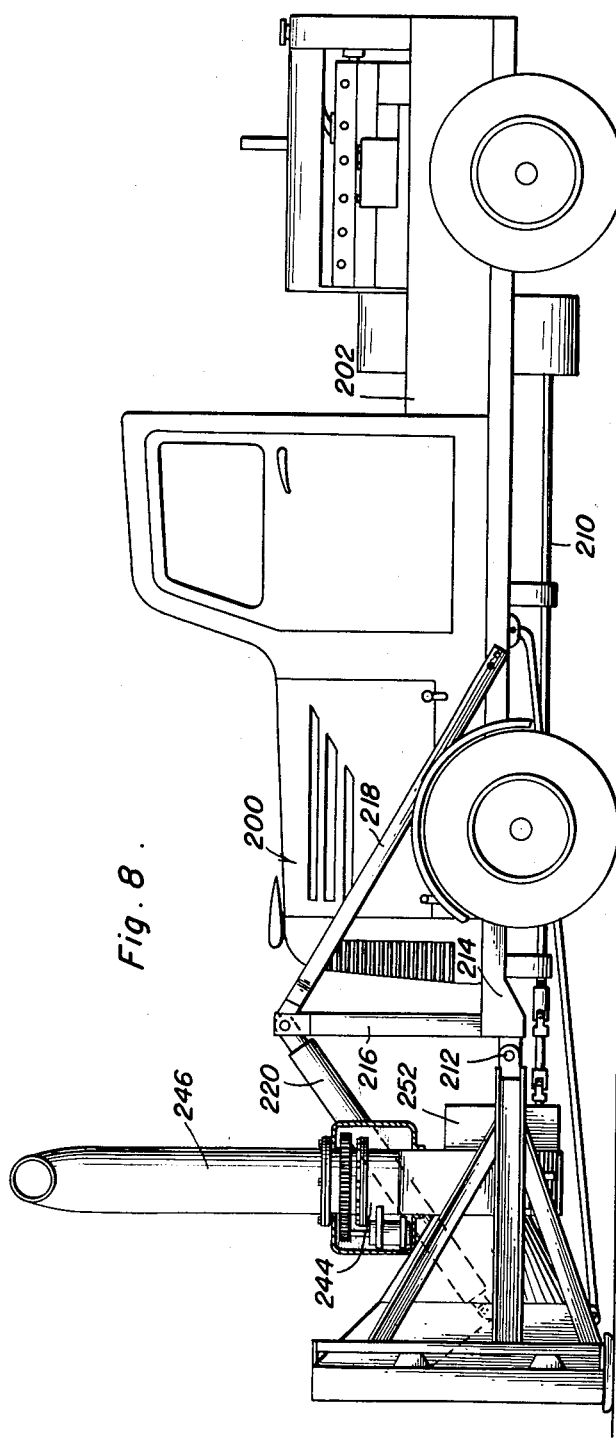
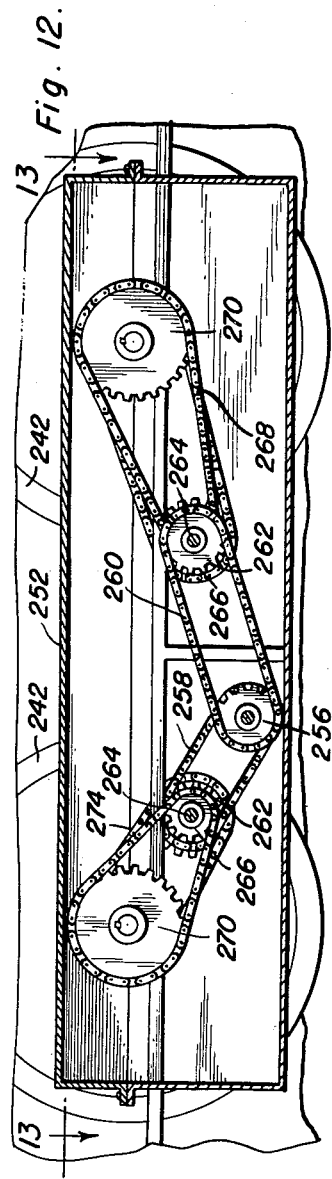
Sebastian J. Fiacco
INVENTOR.

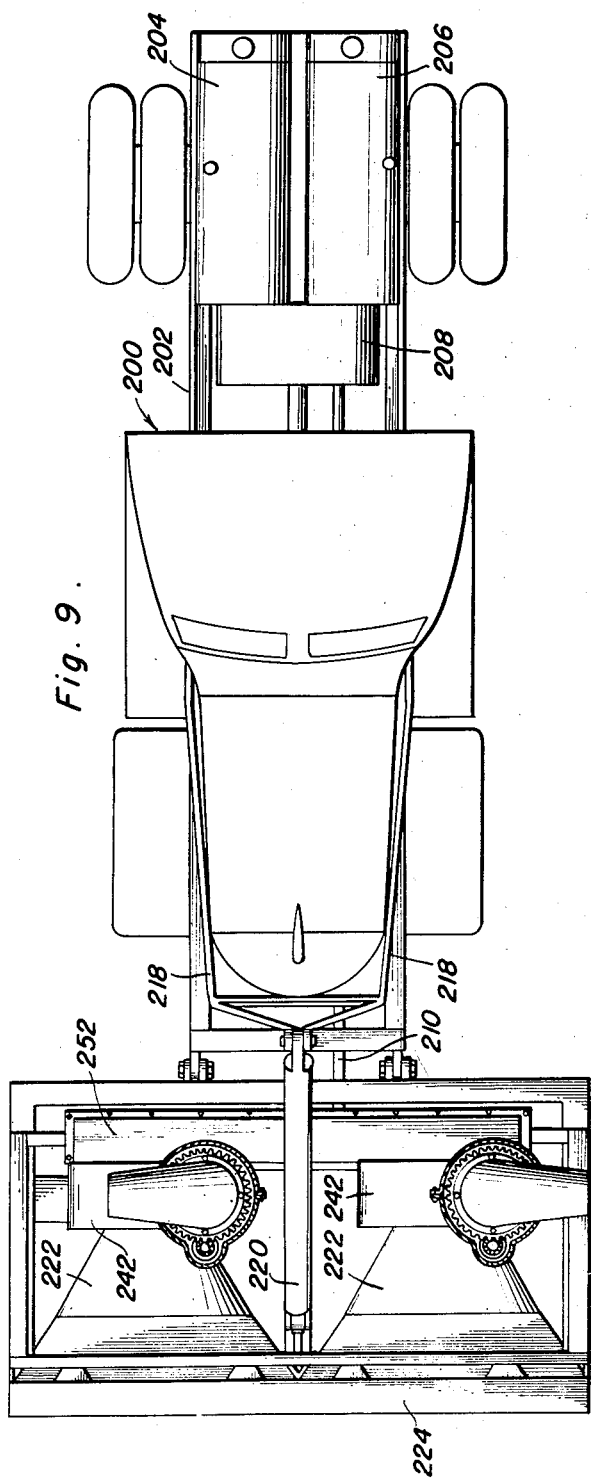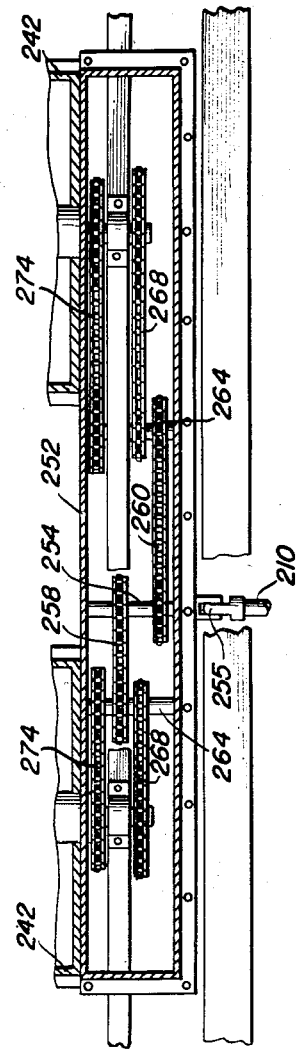

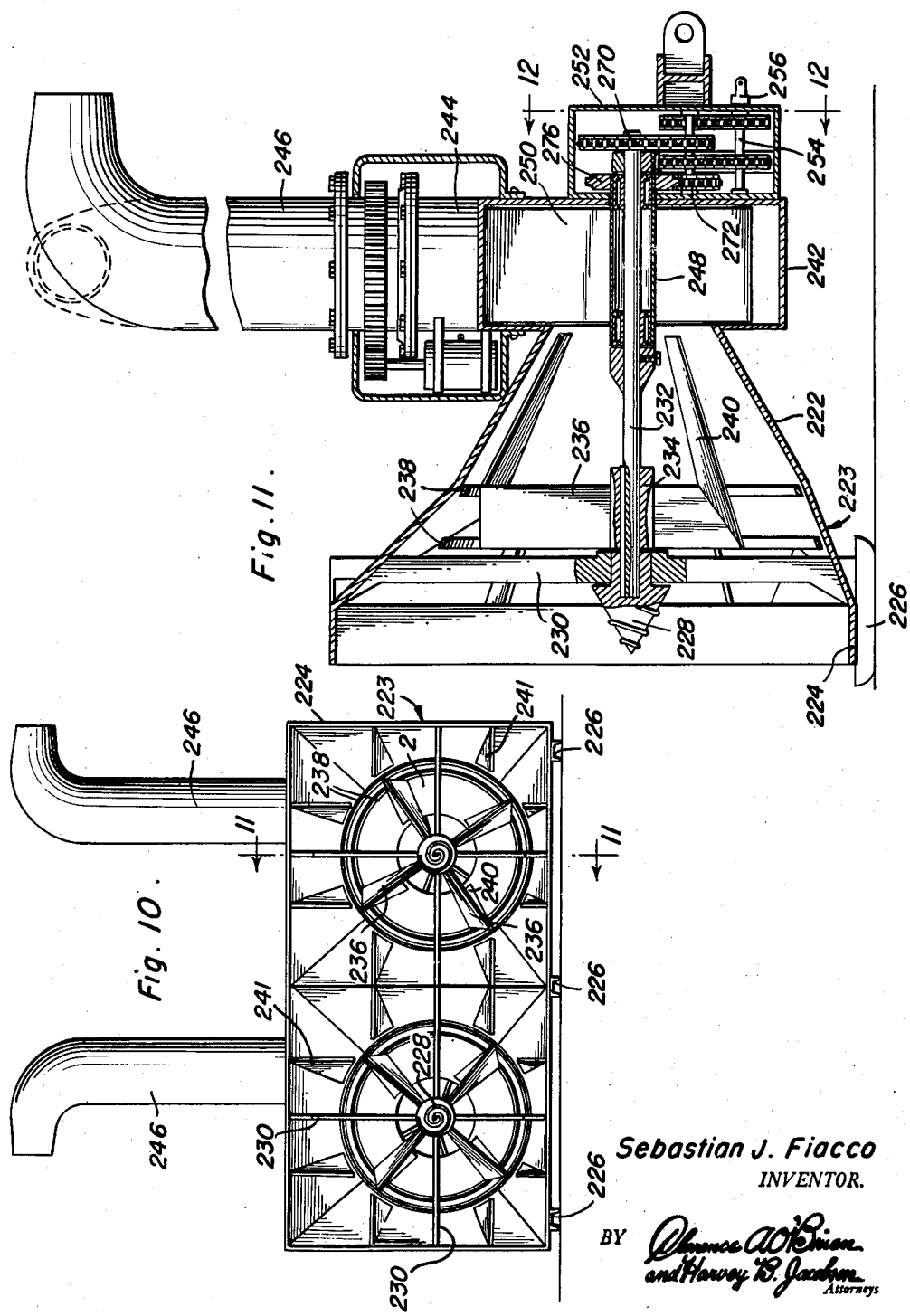

Patented July 15, 1952

2,603,007

UNITED STATES PATENT OFFICE 2,603,007

SNOW SHOVEL ATTACHMENT FOR MOTOR VEHICLES

Sebastian J. Fiacco, Norwood, N. Y.

Application May 3, 1948, Serial No. 24,783

3 Claims. (Cl. 37—43)

This invention relates to novel and useful improvements in a snow shovel attachment for motor vehicles and more specifically pertains to a roadway snow plow attachment which may be readily applied to or removed from motor vehicles, converting the same into rotary snow plows.

The principal object of this invention is to provide a highly satisfactory and efficient rotary snow plow construction for use with motor vehicles and more particularly to provide the same in the form of an attachment which may be readily applied to or removed from motor vehicles as desired.

An important feature of the invention consists in the provision of a supporting frame which may be readily applied to or removed from a motor vehicle as an attachment therefor, and which supporting frame is adjustably and pivotally mounted upon a motor vehicle and carries a snow funnel which collects snow during the forward progress of the vehicle and discharges the same into a rotary blower which, in turn, discharges the snow through a discharge conduit in various selected directions.

A further feature of the invention resides in the provision of an apparatus as set forth in the preceding paragraphs wherein a common power operated driving means is provided for energizing the blower and for actuating a snow or ice cutter rotatably mounted in the funnel at the forward or inlet end thereof, in advance of the blower.

A still further important feature of the invention resides in the provision of a novel construction of rotatable cutter provided with vanes which are rotatable in the snow collecting funnel in close juxtaposition to the side walls thereof for preventing and removing accumulations of snow from the interior of the funnel.

A still further important feature of the invention comprehends the provision of power operated means for controllably directing the snow discharge conduit in predetermined or pre-selected directions without interfering with the operation of the device.

Yet another feature of the invention resides in the provision of an attachment wherein the power operating means for the cutter and the blower consists of an internal combustion engine which may be either mounted upon the supporting frame to be removable therewith as a unitary attachment; or if desired may be carried in the body of a truck or the like as preferred.

And a final important feature of the invention to be specifically enumerated herein comprehends the provision of a construction wherein concentric actuating shafts are provided for the rotatable cutter and the blower for operating the same, together with a gearing assembly which is carried by the blower for simultaneously connecting both of the concentric shafts with the common power operating means.

These, together with various ancillary features and objects of the invention which will later become apparent as the following description proceeds, are attained by this device, preferred embodiments of which have been illustrated, by way of example only in the accompanying drawings, wherein:

Figure 1 is a side elevational view showing one embodiment of the invention mounted upon a motor vehicle for transportation thereby, parts being broken away to show the interior construction thereof, and an alternative position of the adjustable discharge orifice being indicated in dotted lines;

Figure 2 is a fragmentary top plan view of the construction shown in Figure 1, parts being broken away to show the interior construction thereof;

Figure 3 is a vertical longitudinal sectional view, taken upon an enlarged scale, of the attachment shown in Figure 1, parts being broken away to disclose the interior construction thereof;

Figure 4 is a fragmentary detail view, taken upon an enlarged scale, and substantially in vertical longitudinal sectional view, showing the construction of the concentric driving shafts forming a part of the invention;

Figure 5 is a front elevational view of the snow collecting funnel forming an element of the invention;

Figure 6 is a vertical transverse sectional detail view taken substantially upon the plane of the section line 6—6 of Figure 3, and showing the construction of the snow discharge conduit adjusting mechanism and construction;

Figure 7 is a perspective view of the upper section of the relatively rotatable discharge conduit forming a part of the invention;

Figure 8 is a side elevational view, similar to Figure 1, but showing a second embodiment of the invention;

Figure 9 is a top plan view of the construction shown in Figure 8, parts being broken away to show the interior construction thereof;

Figure 10 is a front elevational view of the construction shown in Figure 8;

Figure 11 is a fragmentary vertical longitudinal sectional view taken upon an enlarged scale substantially upon the plane of the section line 11—11 of Figure 10, showing the interior construction of one of the units of the cutter, blower and blower discharge conduit adjusting means, forming a part of the invention;

Figure 12 is a vertical transverse sectional detail view taken upon an enlarged scale substantially upon the plane of the line 12—12 of Figure 11 and showing the gearing assembly housed in a gear casing supported by the lower units; and Figure 13 is a horizontal sectional detail view taken substantially upon the plane of the section line 13—13 of Figure 12 and showing further details of the gearing assembly for driving the blowers.

Referring now more specifically to the accompanying drawings, wherein like numerals designate similar parts throughout the various views, attention is directed first to the embodiment of Figures 1-7, wherein there is disclosed a unitary attachment including the power plant for operating the same and which is detachably connected to the front of a truck or like vehicle.

Although the principles of the invention are obviously applicable to any suitable type of vehicle, they find their most practical embodiment and application to motor vehicles of the truck type, wherein they form an accessory or attachment for adapting these vehicles to use by various State highway or road departments for clearing snow from main and side roads, as well as for use by individuals in removing snow from private property, roads and the like.

Indicated generally at 10 is a portion of a motor truck, which is illustrated as being of the type having a dump body 12, which is operated by suitable mechanism not shown, from a supporting standard construction 14 in a known manner.

Pivotally attached as by removable pins 16, to suitable supporting brackets 18 carried by the front end of the motor truck 10, is a supporting frame of any suitable construction but which includes longitudinally extending parallel side members 20, and transverse members 22.

At their front ends, the side members 20 are provided with supporting lugs 24, which receive the ends of upwardly and rearwardly extending support rods 26, whose other extremities are detachably connected as by bolts or the like 28 to the above mentioned support standard 14 of the dump body 12 of the truck. Of course, the support rods 26 may be attached to any other suitable part of the frame work of the truck, and together with the pins 16 serve to rigidly and securely but removably attach the supporting frame to the motor vehicle.

It is, of course, to be understood that the support rods 26 may be provided with any suitable means for adjusting the length of the same, whereby the frame members 20 may be pivoted about their support pins 16, to thereby vary the inclination and elevation of the attachment with respect to the supporting motor vehicle and also with respect to the surface of the road bed or other surface to be cleansed of snow.

As will be more clearly apparent by reference to Figure 3, the supporting frame 20 has suitably mounted thereon a snow collecting funnel 32 whose front end is open and enlarged and provided with a forwardly extending substantially square flange 34, to which are secured shoes or slides 36 beneath the lower edge thereof whereby the funnel in its lowered position may be slid upon the road surface if desired. A plurality of snow cutting vanes 33 are disposed about the inner face of the funnel 32, and extend inwardly thereof, the vanes extending substantially perpendicular to the side of the funnel to which they are attached.

The rearward end of the funnel 32, which is of lesser diameter than the forward end, opens into an integral, preferably annular blower casing 38, and substantially at the axial center thereof, which casing, as shown in Figure 6, is provided with a tangentially disposed upwardly extending discharge conduit lower section 40 upon which is rotatably mounted an upper section 42 terminating in a laterally disposed discharge pipe 44 constituting a discharge orifice.

It is intended that the upper section 42 shall be supported upon the lower section 40 for rotation about a vertical axis, in order to permit the angular positioning of the discharge nozzle or orifice 44 in various selected directions, whereby the stream of snow delivered by the blower may be discharged in any desired direction in accordance with the desires of the operator.

For this purpose, the adjacent ends of the sections 40 and 42 are provided with laterally extending annular flanges 46, and 48, respectively, which flanges are rotatably secured in axially aligned abutting engagement by means of a flanged retaining rim or flanged member 50 removably mounted upon the flange 46 as by fastening bolts 52, to constitute a coupling flange or gland for retaining the upper section upon the lower section.

In order to regulate the rotatable movement of the upper section upon the lower section, the former is provided with a rigidly attached ring gear 54 of any suitable construction. The ring gear, as shown best in Figure 3, is constantly in mesh with a drive pinion 56 secured to a shaft 58. The shaft 58 is journaled in the casing 60 of an electric motor or the like which is secured as by a clamp 62 in any desired manner to the stationary lower section 40. It will thus be seen that in effect the driving pinion 56 and its shaft 58 are journaled upon and carried by the stationary lower section. If desired, the electric motor 60 may be replaced by any suitable means, including a manually operable crank for rotating the shaft 58, whereby the upper section may be rotated upon the lower section as desired. Of course, it will be understood that any suitable controls and electrical circuits will be provided for energizing and controlling the operation of the motor 60, and since these are of conventional design, it is deemed to be unnecessary to disclose the same in these drawings.

In order to better protect the driving pinion 56 and the ring gear 54 and their associated parts from undue wear, and from interference with their operation by the weather or other conditions, an enclosing housing 64 of any suitable construction is provided, this housing being rigidly secured and mounted upon the lower section 40, in a position to embrace and enclose the above mentioned gearing, which housing terminates in an upper inwardly disposed flange 65 which loosely embraces the rotatable section 42.

Attention is now directed more specifically to Figures 3 and 5, where it will be seen that there is mounted within the open end of the funnel 32, a supporting spider 66 of any desired construction, in which is journaled a conical ice or snow cutter head 68, for breaking hardened deposits of snow and ice encountered by the snow plow. This cutter head 68 is detachably mounted as by a spline 70 upon the forward end of a driving shaft 72, whose rearward end is suitably journaled in the lower housing 38 in any desired manner and is operated in a manner to be subsequently set forth.

As will thus be seen, the cutter head 68 is rotatably mounted and carried by the spider assembly 66 within the confines of the open end 34 of the collecting funnel 32, whereby the thrust of the engagement of the cutter with the snow or ice is absorbed by the spider rather than by the driving shaft 72. Moreover, there is fixedly secured to the shaft 72 by the above mentioned spline 70, the hub portion 74 of a snow feeding screw or propeller having radially extending propeller blades 76 whose edges are secured to a frusto-conical shaped annular rim 78 and from which extend rearwardly disposed vanes or blades 80 whose outer edges are disposed in juxtaposition to the inner surface of the funnel 32. This construction is such that upon rotation of the shaft 72, the propeller blades 76 are caused to feed the snow collected by the forward motion of the funnel 32 through snow drifts and the like into the funnel 32, and force the same to the inner or discharge end thereof into the pump casing 38, the vanes 80 serving to prevent and remove incrustations or deposits of snow collecting or tending to collect within the funnel 32.

As will be more readily apparent from Figures 3 and 4, there is rotatably mounted as by means of anti-friction bearings 82, the tubular hub portion or sleeve 84 of the blower fan, having integral, radially extending vanes or blades 86 attached thereto. This hub 84 is retained within the casing 38 in proper position therein upon the shaft 72 as by means of a removable collar 88 at one end of the hub, and a sprocket gear hub 90 at the other end of the sleeve or hub 84. It will thus be seen that the hub 84 is freely rotatable upon and supported by the rotatable shaft 72, whereby the fan 86 is free to rotate independently of the shaft 72, and of the feed screw 76 and cutter 68 carried thereby.

The inward end of the shaft 72, as shown in Figure 3, is suitably journaled in a standard or support 92 of any desired construction. Rigidly attached to the hub 84, is a driven sprocket 94, while a similar sprocket 96 is integrally formed by and carried by the hub 90.

As will thus be seen, the sprockets 94 and 96 constitute means by which the blower 86 and the cutter and feed screw shaft 72 may be operated or driven. These sprockets are connected as by sprocket chains 98 and 100 with corresponding sprockets carried by a power shaft 102, this shaft being suitably connected as through the agency of a clutch and if desired a transmission, of any known and desired construction, not shown but indicated generally by the housing 104, and controlled by a lever 106 or the like, with the power plant which may be of any suitable type and may conveniently consist of an internal combustion engine indicated generally by the numeral 108 which is suitably mounted upon the supporting frame.

From the foregoing, the construction of this embodiment of the principles of the invention will be readily understood and the operation thereof is as follows:

When it is desired to make use of the invention, the entire unitary assembly shown in Figure 3 is attached to a motor truck in the manner shown in Figure 1, for transportation thereby. The rod 26 may be adjusted as desired to raise or lower the front of the device, permitting the runners 36 to rest upon the road bed, or to elevate the lower end of the funnel above the road bed a predetermined distance as desired. The internal combustion engine 108 is then started, the clutch 104 engaged, whereupon the power shaft 102 of the engine rotates the concentric shafts consisting of the hub or sleeve 84 of the blower fan 86, and the shaft 72 which powers the feeding screw 76 and the cutter 68. As the truck now moves forward, any snow collecting or drifting in front of the same is forced inwardly of the open end of the funnel 32, ice or frozen deposits broken up by the cutter head 68, and this snow is then fed by the feed screw 76 through the funnel and into the inlet opening of the blower casing 38, from whence the centrifugal fan blades 86 discharge the same upwardly through the discharge conduit sections 40 and 42 and from the nozzle or orifice 44 thereof. By any suitable means (not shown) the pinion 56, pinion shaft 58, and motor 60 or other control means is operated to thereby position the discharge nozzle 44 in any desired direction, whereby the snow discharged from the blower may be hurled into the desired direction from the apparatus as the same progresses along the surface to be cleared.

Attention is particularly directed to the second embodiment of the invention illustrated in Figures 8–13 of the drawings. Here a truck designated generally by the numeral 200 is provided with a body portion 202, in which is mounted a pair of internal combustion engines 204 and 206, of any suitable type, for powering the snow plow as set forth hereinafter. These engines are coupled by any suitable transmission and clutch arrangement 208 for driving a power take-off shaft 210 which is positioned beneath the body of the truck and supported in any suitable manner therefrom, for supplying power to the snow plow attachment mounted upon the front of the truck. This attachment includes a supporting frame which may be of similar construction to the supporting frame of the previously described embodiment, and which supporting frame is pivotally mounted as by pins 212 to forwardly extending support arms or brackets 214 affixed to the front portion of the frame of the truck.

In this embodiment, however, a different means from that described in connection with the first embodiment of the invention is provided for adjustably mounting in various inclined positions, the supporting frame from the truck. For this purpose, supporting standards 216 are carried by the brackets 214, which standards at their upper ends are rigidly attached as by brace rods 218 to a portion of the frame of the truck. Suitable hydraulic operating cylinders and pistons of known construction indicated generally by the numeral 220, are terminally connected to the front ends of the supporting frame and the top ends of the support standards 216, whereby upon actuation of the hydraulic cylinders 220 in a known manner from the hydraulic power take-off of the truck or any other suitable source of fluid pressure, the frame may be raised or lowered at its supporting pins 220 to secure a vertical adjustment of the frame in the same manner and for the same purposes set forth in connection with the preceding embodiment. Suitably mounted upon the frame are a pair of sidewise aligned rotary snow plow units, each of which consists of a funnel 223 for collecting snow and provided with enlarged open front ends formed by the rectangular forwardly extending rims or flanges 224, which upon their lower surface are provided with shoes or slides 226. Each of these snow plow units is provided with a cutter head 228 journaled in supporting spiders 230, which heads are detachably carried by the drive shafts 232, all in the manner set forth in the preceding embodiment.

Also as in the preceding embodiment, the shaft 232 rearwardly of the spider 230 has splined thereon the hub 234 of a snow feeding screw or propeller having the customary propeller or screw blades 236 which are peripherally reinforced as by annular rings 238. Extending rearwardly from the blades 236, are inwardly converging vanes or blades 240. A plurality of snow cutting vanes 241 are disposed about the inner face of the funnel 223, which vanes extend substantially perpendicular to the side of the funnel to which they are attached.

The blades 236 and the vanes 240 serve the same functions and operate in the same manner for the same purposes as the corresponding elements 76 and 80 of the previously described embodiment of the invention.

Likewise, the collecting funnel 222 carries at its small inner end, the annular lower casing 242 from which extends upwardly tangentially disposed lower and upper sections 244 and 246 of the snow discharge conduits. These snow discharge conduits, one for each of the lower units, are identical in construction and operation with the sectional conduits described in connection with the first embodiment of the invention, and further description regarding the same is, therefore, believed to be unnecessary.

Likewise, the shaft 232 has rotatably journaled thereon the hub or sleeve constituting a concentric shaft 248 from which extend the blades or vanes 250 of the blower fan, this hub being secured to the shaft 232 in exactly the same manner as set forth for the corresponding parts of the first embodiment of the invention.

Extending transversely across and supported by the rear surfaces of the two blower casings 242, is a gearing assembly housing 252, which houses the gearing for transmitting power from the driving shaft 210 to the two sets of concentric shafts 232 and 248 of the two blower units. For this purpose, there is journaled in the gearing assembly casing 252, a longitudinal shaft 254, which is connected as by a universal coupling 255, with the above mentioned shaft 210 for operation thereby. Carried about the shaft 254 are spaced sprocket wheels 256 which are drivingly connected as by sprocket chains 258 and 260 with the blower and cutting shafts of the two blower units. For this purpose, as shown best in Figures 12 and 13, the chains 258 and 260 are connected with driven sprockets 262 upon transverse shafts 264 journaled in the gearing assembly housing. These shafts are, in turn, connected by further sprockets 266 and sprocket chains 268 with sprockets 270 attached to the ends of the cutter and feed screw shafts 232 for rotation of the same, while similar sprockets 272 carried by the shafts 264 are connected as by sprocket chains 274, which sprockets 276 are fixed to and carried by the sleeves or hubs 248 whereby the blowers 250 are operated. It will thus be seen that a common driving means is provided for conveying the power from the engine power plant mounted in the body of the truck, to the two units mounted upon the attachment supported at the front end of the truck, for simultaneously operating the cutter, the feed screw, and the rotary blower.

This embodiment of the invention is intended to provide a device adapted for much heavier operation and of a much greater capacity than the previous embodiment described. It will be noted that the discharge orifices or nozzles of each of the blower units are independently operable to direct the stream of snow discharged therefrom, while the heavy duty power plant is mounted in the body of the truck to provide the necessary power for operating the device.

From the foregoing, the manner of construction and operation of the device will be readily understood and further explanation is believed to be unnecessary. However, since numerous modifications will readily occur to those skilled in the art after a consideration of the foregoing specification and accompanying drawings, it is not intended to limit the invention to the exact construction shown and described, and accordingly various modifications and equivalents may be resorted to falling within the scope of the appended claims.

Having described the invention, what is claimed as new is:

1. In a rotary snow removal apparatus having a support and means for mounting the same on a motor vehicle; a funnel on said support comprising a rectangular frame, a frustum of a cone, an extension connecting the periphery of the frame to the periphery of the larger diameter end of the frustum, a snow cutter shaft mounted coaxial with said frustum, radial arms forming a spider mounted in said funnel, said spider providing means for bracing the sides of said rectangular frame, said spider also providing means for rotatably supporting said shaft, said spider further providing snow cutting means, a cutter having pitched blades radially mounted on said shaft, an annular rim terminally connecting said blades, rearwardly extending vanes mounted on said rim, one edge of said vanes disposed parallel to the inner surface of said frustum, a conical snow cutting head mounted on the end of said shaft providing means for by-passing snow around said shaft end.

2. The combination of claim 1 including a rotary blower on said support having an intake communicating with the smaller diameter end of said frustum, common driving means operatively connected to said cutter and blower, and a snow delivery conduit communicating with said blower.

3. A rotary snow plow attachment for motor vehicles comprising a supporting frame and means for pivotally mounting the same upon a motor vehicle, a funnel on said frame having a rectangular inlet opening the sides of which merge with the larger diameter end of a frustum of a cone, a cutter rotatably mounted coaxial with said frustum, said cutter having pitched radially extending blades, an annular frusto-conical rim securing the edges of said blades, rearwardly disposed vanes attached to said rim, one edge of said vanes being disposed parallel to the inner surface of said frustum for preventing the accumulation of snow therein, shear bars mounted in said rectangular inlet opening, said cutter being mounted on an axle, said axle rotatably journaled on said shear bars, a conical snow by-pass head mounted on the end of said axle, said rectangular inlet opening having snow shearing stationary vanes mounted on its inner surface, a rotary blower on said frame having an intake communicating with smaller diameter end of said frustum, common driving means operatively connected to said cutter and blower, said blower having an outlet.

SEBASTIAN J. FIACCO.

REFERENCES CITED

The following references are of record in the file of this patent:

UNITED STATES PATENTS

| Number | Name | Date |
| --- | --- | --- |
| 541,766 | Linton | June 25, 1895 |
| 1,848,554 | Smith et al. | Mar. 8, 1932 |
| 1,923,444 | LaClair | Aug. 22, 1933 |
| 2,092,536 | Sicard | Sept. 7, 1937 |
| 2,143,699 | Jensen | June 10, 1939 |
| 2,219,204 | Wandscheer | Oct. 22, 1940 |
| 2,269,326 | Wandscheer | Jan. 6, 1942 |
| 2,403,257 | Becker | July 2, 1946 |